United States Patent
Funk et al.

[11] Patent Number: 6,012,341
[45] Date of Patent: Jan. 11, 2000

[54] FORCE SENSOR HAVING AN ADJUSTABLE DISTANCE BETWEEN AN OPERATING POINT AND A POINT OF MECHANICAL INSTABILITY

[75] Inventors: Karsten Funk, Stuttgart; Hans-Martin Kulcke, Boeblingen; Franz Laermer, Stuttgart; Werner Uhler, Bruchsal; Andrea Schilp, Schwaebisch Gmuend, all of Germany

[73] Assignee: Robert Bosch GmbH, Stuttgart, Germany

[21] Appl. No.: 09/091,315
[22] PCT Filed: Oct. 31, 1996
[86] PCT No.: PCT/DE96/02070
§ 371 Date: Sep. 23, 1998
§ 102(e) Date: Sep. 23, 1998
[87] PCT Pub. No.: WO97/22864
PCT Pub. Date: Jun. 26, 1997

[30] Foreign Application Priority Data

Dec. 16, 1995 [DE] Germany .......................... 195 47 184

[51] Int. Cl.⁷ .................................... G01L 1/10
[52] U.S. Cl. .......................................... 73/862.59
[58] Field of Search ................. 73/862.381, 862.59, 73/763, 765, 766

[56] References Cited

U.S. PATENT DOCUMENTS

| 5,166,892 | 11/1992 | Inoue et al. ............... 702/101 |
| 5,339,698 | 8/1994 | Robinson et al. ........... 73/862.59 |
| 5,417,120 | 5/1995 | Hulsing, II ................ 73/862.59 |
| 5,553,506 | 9/1996 | Benz et al. ................ 73/862.59 |

FOREIGN PATENT DOCUMENTS

| 27 49 937 | 5/1978 | Germany . |
| 43 33 099 | 3/1995 | Germany . |
| 44 26 163 | 1/1996 | Germany . |

*Primary Examiner*—Max Noori
*Attorney, Agent, or Firm*—Kenyon & Kenyon

[57] ABSTRACT

A force sensor, especially an acceleration sensor or a pressure sensor, has a structure that vibrates in resonance, and its oscillation frequency is variable due to an acting force which is to be detected. The distance of an operating point of the force sensor from the point of its mechanical instability can be adjusted by applying an electric voltage.

6 Claims, 4 Drawing Sheets

| $V(x)$ | $\dfrac{\partial V}{\partial x}$ | $\dfrac{\partial^2 V}{\partial x^2}$ |
|---|---|---|
|  |  |  |
|  |  |  |
|  |  |  |

FORCE SENSOR HAVING AN ADJUSTABLE DISTANCE BETWEEN AN OPERATING POINT AND A POINT OF MECHANICAL INSTABILITY

BACKGROUND INFORMATION

Known force sensors are designed as frequency-analog resonant mechanical sensors. Such known force sensors include a structure that vibrates in resonance. The oscillation frequency of this structure is variable on the basis of an acting force, such as an acceleration or a pressure, to be detected. Due to the external action of the acting force, the structure vibrating in resonance is deflected so that it changes its oscillation frequency. The structure vibrating in resonance is formed by a spring-mass system, where an increase in sensitivity of a force sensor can be achieved by an increase in the seismic mass, a reduction in rigidity of the springs, or a combination of the two measures.

However, a disadvantage of the known force sensor discussed above is that a reduction in the fundamental frequency at which the structure vibrates in resonance occurs, so that there is a negative effect on sensor dynamics. On the other hand, an increase in sensor dimensions is associated with an increase in seismic mass.

German Published Patent Application No. 4,426,163 describes an acceleration sensor where the structure vibrating in resonance is under a mechanical prestress, so that the force sensor is operated near its mechanical instability. This increases the sensor sensitivity of the force sensor by placing an operating point of the sensor closer to the mechanical instability. The distance of the operating point from the mechanical instability is determined by a parameter of the applied mechanical prestress. However, it is a disadvantage here in that it is difficult to accurately set the distance of the operating point from the mechanical instability, e.g., due to geometric tolerances in the layout of the sensor, due to temperature dependences, and due to layer stresses which occur due to the mechanical prestress and are difficult to control. Especially when the force sensor is to be operated near its mechanical instability to increase sensor sensitivity, even the slightest shifts in operating point will lead to great signal variations and thus signal errors.

SUMMARY OF THE INVENTION

By contrast, the force sensor according to the present invention offers the advantage that it is possible to accurately set a certain selectable distance between the operating point and the point of mechanical instability. Due to the fact that the distance of an operating point of the force sensor of the present invention from its point of mechanical instability is adjustable, it is advantageously possible to compensate for deviations that occur during production or operation of the force sensor of the present invention, e.g., due to layer stresses, temperature dependences and manufacturing tolerances in addition to accurately setting the distance, so that over the operating life of the force sensor of the present invention, it is possible to very accurately and uniformly set and/or readjust the operating point, especially the smallest possible distance from the mechanical instability of the force sensor of the present invention.

In addition, it is advantageous that different measurement ranges can be set on the force sensor of the present invention due to the adjustability of the distance of the operating point from the point of mechanical instability. The distance of the operating point from the point of mechanical instability of the force sensor of the present invention, which is determined by its geometry, can be varied through the operating point adjustment. Different sensor sensitivities are obtained, depending on the distance of the operating point from the point of mechanical instability, and they have different reactions accordingly on an externally acting force to be detected. In addition, it is a great advantage that the operating point of the force sensor of the present invention can be varied within certain limits while being used as intended. This permits switching of the force sensor of the present invention, e.g., from one measurement range to another, in a very advantageous manner, so that a different, selectable signal capture and/or processing is/are possible.

An advantageous embodiment of the present invention provides for the structure vibrating in resonance to be under a mechanical prestress and for an additional external force to act upon it, with the additional external force preferably being an electrostatic force. This makes it easily possible to apply an electrostatic bias in addition to its mechanical prestress by applying a voltage to an electrode arranged at a distance from the structure vibrating in resonance, so that the natural frequency can be lowered without altering the geometric structure of the force sensor of the present invention, thereby increasing the sensitivity of the force sensor of the present invention.

DETAILED DESCRIPTION

Figure 1:
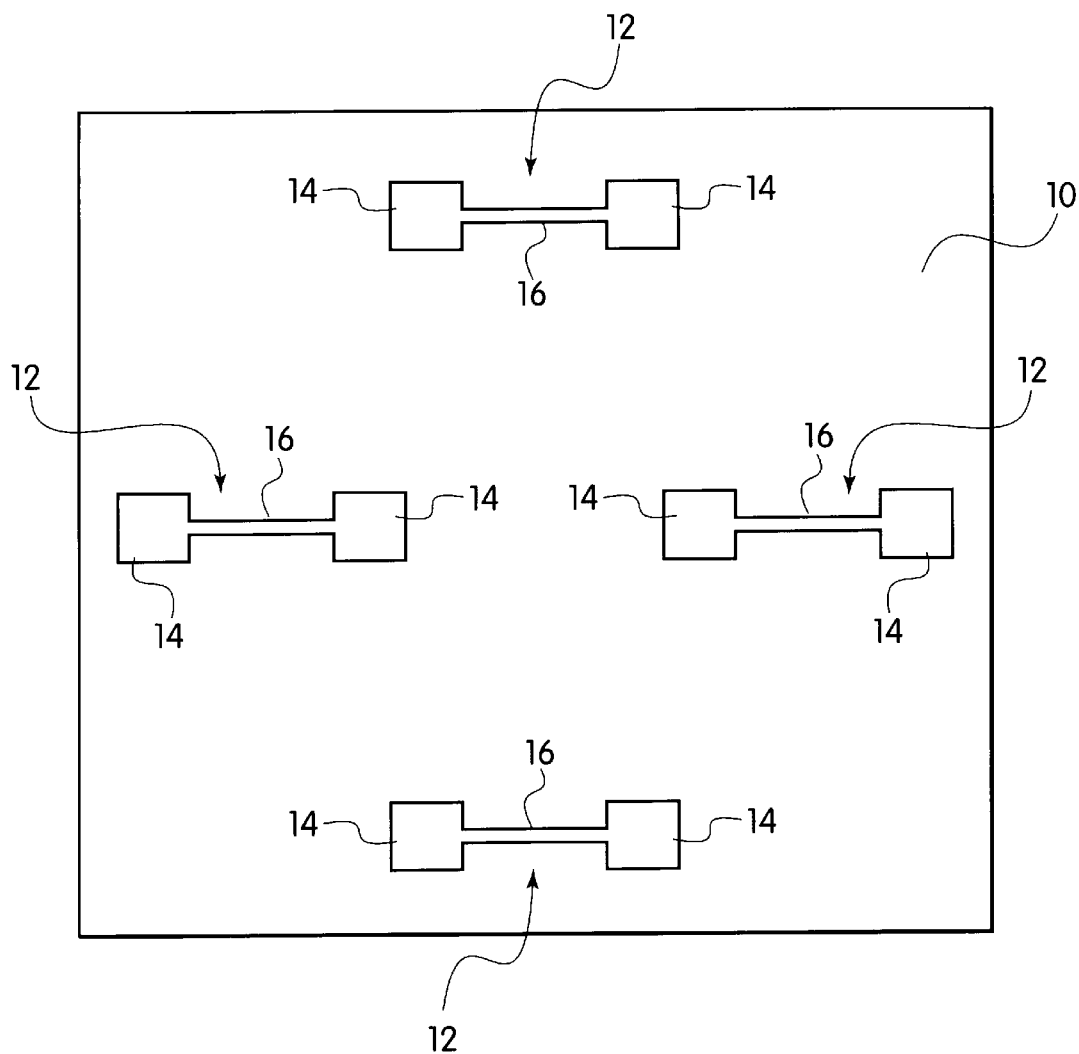
FIG. 1 shows a schematic top view of a pressure sensor including a membrane and voltage pickup.
Figure 2:
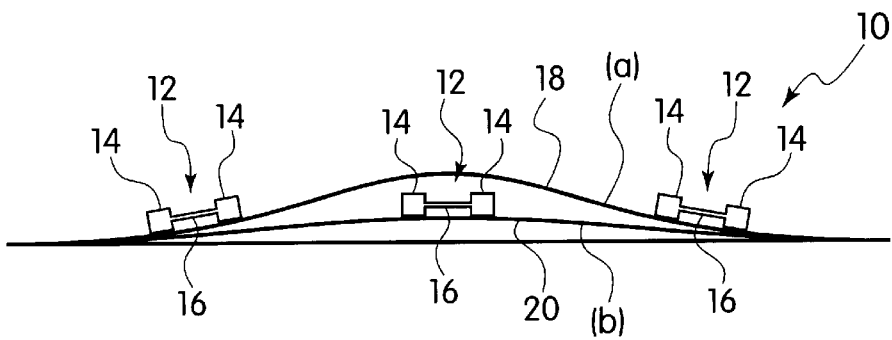
FIG. 2 shows a schematic sectional diagram through the pressure sensor in the deflected state (a) and in the undeflected state (b).

FIGS. 1 and 2 show a pressure sensor 10, which is generally of the type described in German Published Patent Appln. No. 4,333,099 A1. Pressure sensor 10 has a total of four structures 12, each of which has a bending bar 16 stretched between two bearings 14. Structures 12 are arranged on a membrane, which in FIG. 2 is illustrated both as a deflected membrane 18 and an undeflected membrane 20. Deflected membrane 18 is deflected under the influence of an external acting pressure to be detected. The external acting force can also come about through an acceleration or another physical quantity to be measured, in addition to pressure.

Resonant vibration is induced in bending bars 16 by devices not shown here. In the initial state, bending bars 16 thus vibrate at a certain natural frequency $f_0$. Due to the external acting force, the membrane 18 undergoes a certain deflection which is proportional to the external acting force, with bending bars 16 of structures 12 being subjected to compressive or tensile stress, depending on their arrangement on the membrane 18. External bending bars 16 shown in FIG. 2 are under compressive stress, while the internal bending bars 16 are under tensile stress. Due to this stress, bending bars 16 undergo a change in oscillation frequency, which can be detected by suitable pickups (not shown here) in a known way. Due to the change in oscillation frequency, the size of the acting force/pressure can be deduced, so that on the whole a signal proportional to the external acting force/pressure can be supplied by pressure sensor 10.

Figure 3A:
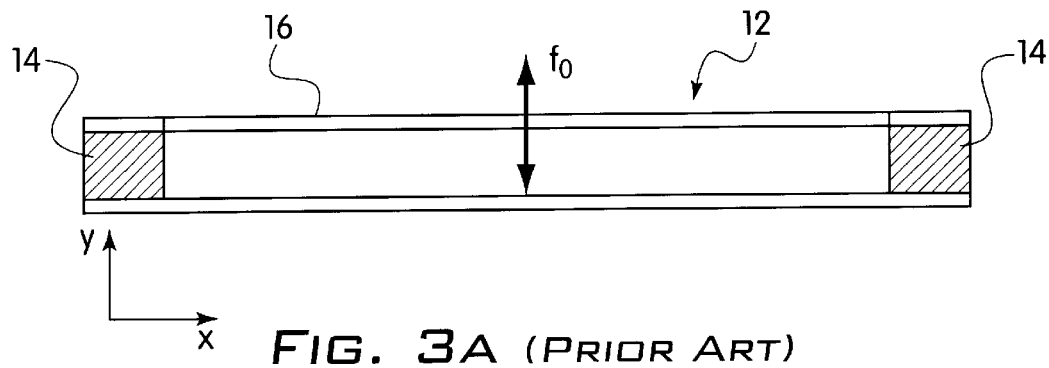
FIG. 3a shows a first schematic diagram of the relationship between a natural frequency and a force on a resonator vibrating in a Y direction.
Figure 3B:
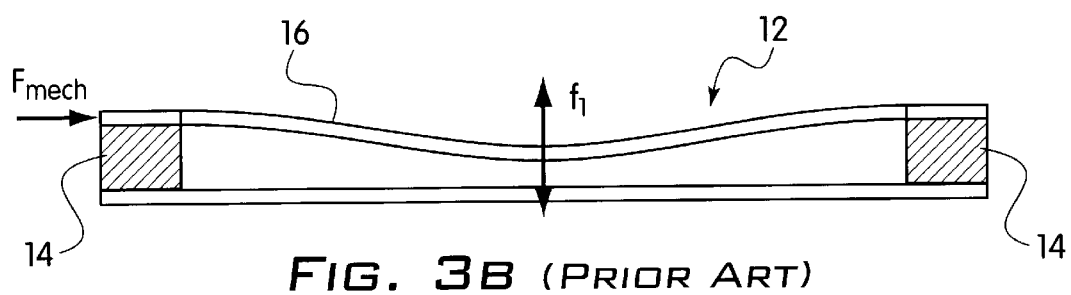
FIG. 3b shows a second schematic diagram of the relationship between the natural frequency and the force on the resonator vibrating in the Y direction.
Figure 3C:
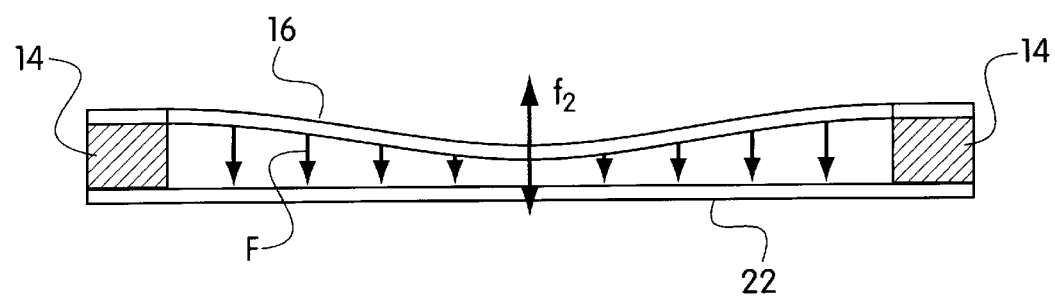
FIG. 3c shows a third schematic diagram of the relationship between the natural frequency and the force on the resonator vibrating in the Y direction.

FIGS. 3a–3c each show schematic diagrams of a structure 12 of force sensor 10. The same parts are labeled with the same reference notation as used in FIG. 1 and will not be discussed further here.

FIG. 3a shows bending bar 16 which vibrates at a frequency $f_0$. FIG. 3b shows a mechanically prestressed bending bar 16 (as described in the German Published Patent Application No. 4,426,163), with bending bar 16 vibrating at a frequency $f_1$ here. Frequency $f_1$ here is smaller than the natural frequency $f_0$, so that structure 12 operates with its operating point closer to the point of mechanical instability, as explained below.

According to the diagram in FIG. 3c, an electrode 22 is arranged beneath bending bar 16, and it is acted upon by a certain voltage potential U. It is known that voltage potential U causes electrostatic forces F which lead to an electrostatic bias on bending bar 16, which then vibrates at an oscillation frequency $f_2$ which is also smaller than natural frequency $f_0$. Bending bar 16 is excited to vibration by means not shown here, e.g., an electrostatic comb drive. These means induce resonant vibration in the bending bar 16 at a frequency f. According to the variants in FIGS. 3a through 3c, resonant frequency f will assume natural frequency $f_0$ or frequency $f_1$ or $f_2$ established due to the mechanical prestress or the electrostatic bias.

Figure 4:
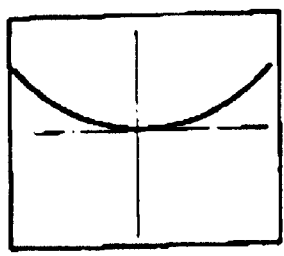
FIG. 4 shows a relationship between mechanical, electrostatic, and electromechanical responses.
Figure 4:
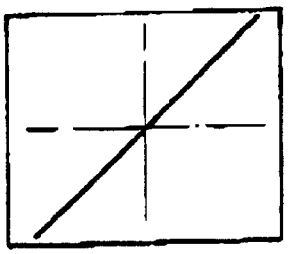
Figure 4:
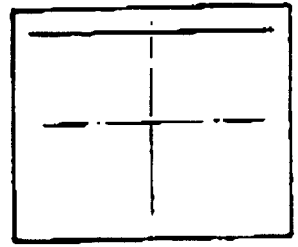
Figure 4:
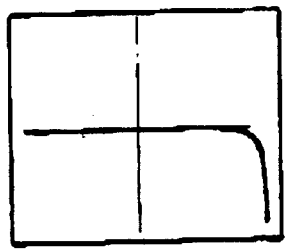
Figure 4:
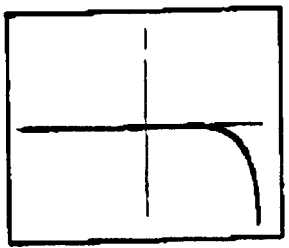
Figure 4:
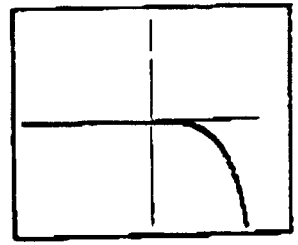
Figure 4:
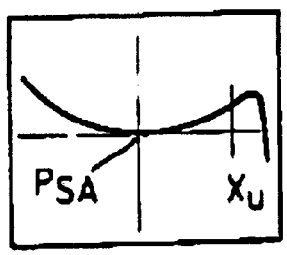
Figure 4:
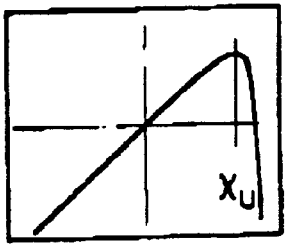
Figure 4:
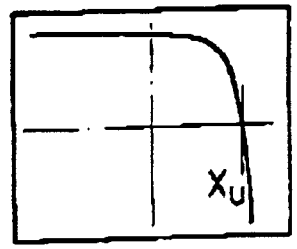

FIG. 4 shows various characteristic curves obtained for a spring constant of the mechanical spring constant and the electrostatic bias. The top line of the characteristic curves shows the potential curve of the mechanical spring, the middle line shows the electrostatic potential, and the bottom line shows the potential curve for superimposing the mechanical spring and the electrostatic potential. The left column illustrates the potential energy V(x), the middle column shows the characteristic curves of the first derivation of the total potential V(x), i.e., the effective force F=–degree V, and the right column shows the second derivation of the potential V(x), namely the effective spring constant of bending bar 16 of structure 12.

For further illustration, reference is made to the bottom line of the characteristic curve, namely for the case when the mechanical prestress and the electrostatic bias are superimposed. The left characteristic curve in the bottom line shows the total potential V(x), which is composed of the spring potential of the linear force-strain dependence of bending bar 16 and a superimposed $1\backslash(x-x_0)$ potential of the electrostatic force, where $x_0$ is the distance of electrode 22 from a bending bar 16 in the resting position of bending bar 16.

In the total potential curve V(x), sensor operating point $P_{SA}$ of structure 12 is shown as the minimum in the total potential curve (the operating point of a harmonic oscillator is always the minimum potential).

The value $x_u$ which is plotted in the characteristic curves for the effective total force F and the effective spring constant represents the inversion point of the total potential function at which the first derivation, i.e., the effective total force F, is at a maximum, and the second derivation, i.e., the effective spring constant, is at zero. This means that the amplitude $x_{max}$ of vibration of bending bar 16 about the operating point must apply and that $x_{max}$ must be much smaller than the value $x_u$. The inversion point of the potential function is determined essentially by control voltage U and the geometry of structure 12, especially bending bar 16 and electrode 22, which is the source of the electrostatic attractive force. It is clear on the basis of the right diagram that the effective spring constant obtained from the second derivation of the total potential function becomes smaller with increasing x values until reaching a value of zero at $x=x_4$. The effective total force derived from the first derivation of the total potential function reaches its maximum here and drops at higher x values.

After exceeding the value $x_u$, the force emanating from the electrostatic attraction becomes greater than the restoring force of bending bar 16. The sum of the forces on bending bar 16 is thus zero at $x_u$, i.e., it has reached its point of mechanical instability.

Due to a displacement of sensor operating point $P_{SA}$ in the direction of the point of mechanical instability, i.e., a change in the distance, namely a reduction in distance here, leads to a greater sensor sensitivity, because a change in oscillation frequency of bending bar 16 due to the action of an external force to be detected leads to a relatively great signal change.

Figure 5:
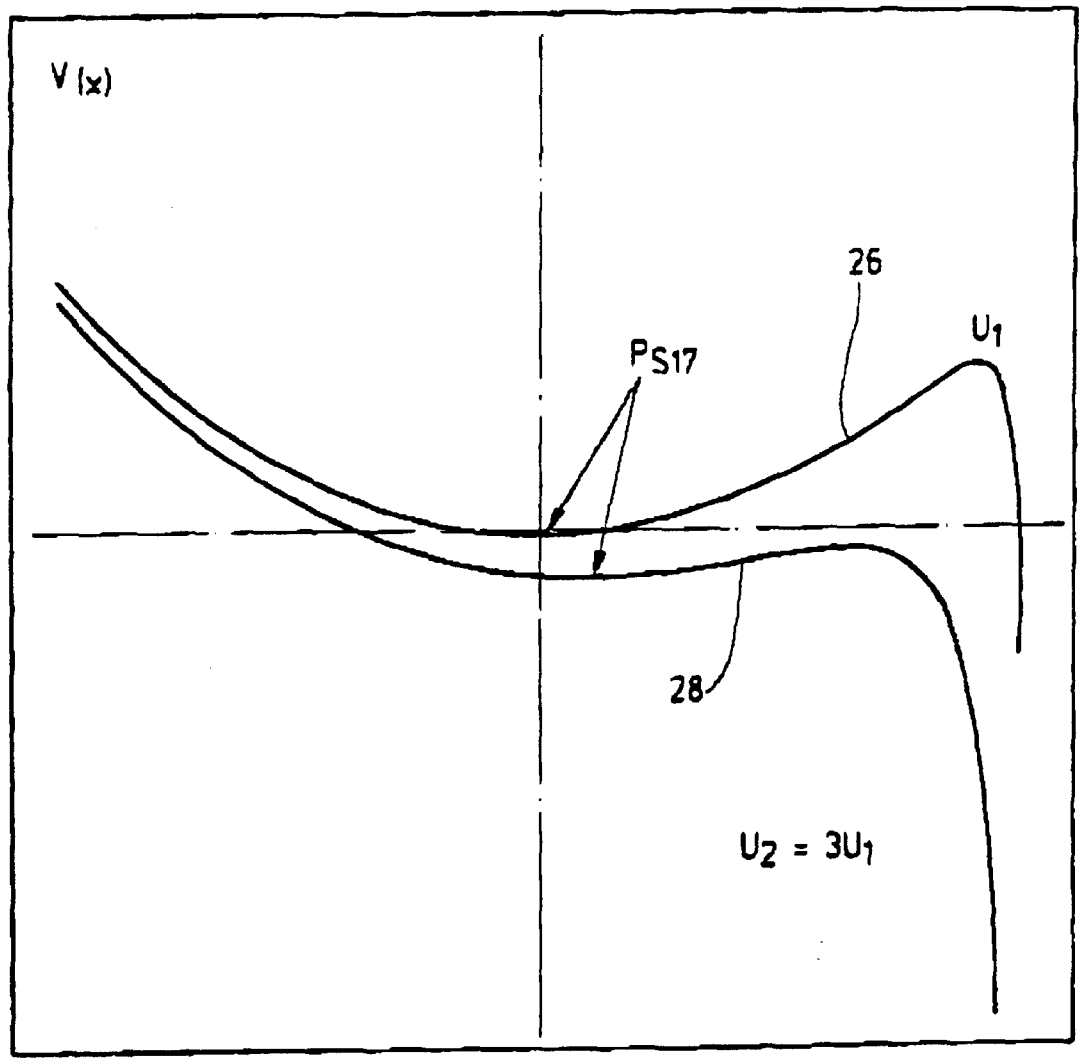
FIG. 5 shows a shift in operating point of an electromechanical resonator with an increase in control voltage U.

The possibility of a shift in the sensor operating point $P_{SA}$ in the direction of the point of mechanical instability is illustrated on the basis of the characteristic curves shown in FIG. 5. The curves shown here for the total potential V(x) of the voltage U applied to electrode 22 illustrate the fact that the sensor operating point $P_{SA}$ at the minimum of potential curve V(x) is shifted toward higher x values with an increase in voltage. At higher x values, as explained previously, the effective spring constant, composed of the mechanical prestress and the electrostatic bias, and thus the resonant frequency f of structure 12 become progressively smaller, and thus the detection sensitivity of the sensor is increased.

FIG. 5 shows a first characteristic curve 26 for a voltage $U_1$ and a second characteristic curve 28 for a voltage $U_2$, which corresponds to three times the value of the voltage $U_1$. It is clear that the sensor operating point $P_{SA}$ is shifted with an increase in voltage U. The electrostatic force F and thus the electrostatic bias of bending bar 16 increase with an increase in voltage U, so it is possible to set the operating point $P_{SA}$ of the sensor or in particular to set a distance of the sensor operating point $P_{SA}$ from the point of mechanical instability of structure 12 by setting the voltage U. On reaching a certain voltage, which is obtained from the equation $U^2 = 8 \times K \times x_0^3 / (27 \epsilon_0 A)$, there is no longer a minimum in the total potential curve, so that the system becomes unstable at that moment. K is the spring constant of the mechanical spring-mass system of structure 12 and A is the effective area of the capacitor formed by electrode 22 and bending bar 16.

What is claimed is:

1. A force sensor, comprising:
   a structure that vibrates in resonance in accordance with a vibrating frequency, the vibrating frequency varying in response to an acting force applied to the structure, wherein a distance between an operating point of the force sensor and a point of mechanical instability of the force sensor is capable of being adjusted by applying an electric voltage.

2. The force sensor according to claim 1, wherein the structure is prestressed and is acted upon by an additional external force.

3. The force sensor according to claim 2, wherein the structure is prestressed according to a mechanical prestress caused by an electrostatic force.

4. The force sensor according to claim 3, wherein the structure includes an oscillator and an electrode arranged at a predetermined distance from the oscillator, and wherein the electrostatic force is applied to the structure by a potential difference between the oscillator and the electrode.

5. The force sensor according to claim 4, wherein the structure includes a plurality of bearings, and wherein the oscillator includes a bending bar clamped between the plurality of bearings.

6. The force sensor according to claim 4, wherein the electric voltage is applied to the electrode, and wherein the distance between the operating point and the point of mechanical instability can be adjusted via a magnitude of the electric voltage applied to the electrode.

* * * * *